United States Patent
Wick

(10) Patent No.: US 8,401,719 B2
(45) Date of Patent: Mar. 19, 2013

(54) AIRCRAFT ENGINE MANAGEMENT FOR FUEL CONSERVATION METHOD

(76) Inventor: Hal Gerard Wick, Sioux Falls, SD (US)

( * ) Notice: Subject to any disclaimer, the term of this patent is extended or adjusted under 35 U.S.C. 154(b) by 0 days.

(21) Appl. No.: 13/226,335

(22) Filed: Sep. 6, 2011

(65) Prior Publication Data

US 2012/0010800 A1 Jan. 12, 2012

Related U.S. Application Data

(62) Division of application No. 12/832,491, filed on Jul. 8, 2010, now Pat. No. 8,014,913, which is a division of application No. 11/831,697, filed on Jul. 31, 2007, now Pat. No. 7,769,503.

(60) Provisional application No. 60/824,941, filed on Sep. 8, 2006, provisional application No. 60/820,972, filed on Aug. 1, 2006.

(51) Int. Cl.
G06F 7/70 (2006.01)
G01S 3/02 (2006.01)
F02C 6/00 (2006.01)
G01C 23/00 (2006.01)

(52) U.S. Cl. ......... 701/14; 342/461; 60/39.15; 73/178 T

(58) Field of Classification Search .................. 701/1, 3, 701/4, 5, 16, 18, 100; 73/1.57, 112.04, 178 T; 60/39.15, 243, 735, 764; 342/461, 462
See application file for complete search history.

(56) References Cited

U.S. PATENT DOCUMENTS

| | | | | |
|---|---|---|---|---|
| 3,852,956 A * | 12/1974 | Martin | ......................... | 60/39.15 |
| 4,217,754 A | 8/1980 | Schmidt-Roedenbeck et al. | | |
| 4,312,041 A * | 1/1982 | DeJonge | ....................... | 701/123 |
| 4,325,123 A * | 4/1982 | Graham et al. | ................ | 701/110 |
| 4,569,021 A * | 2/1986 | Larson et al. | .................... | 701/99 |
| 4,641,268 A * | 2/1987 | Zweifel et al. | ................ | 701/121 |
| 4,959,955 A | 10/1990 | Patterson et al. | | |
| 5,031,102 A | 7/1991 | Robbins et al. | | |
| 5,197,280 A * | 3/1993 | Carpenter et al. | .............. | 60/204 |
| 5,211,007 A | 5/1993 | Marvin | | |
| 5,285,638 A | 2/1994 | Russ et al. | | |
| 5,442,907 A * | 8/1995 | Asquith et al. | .................. | 60/778 |
| 6,282,884 B1 * | 9/2001 | Adibhatla et al. | ......... | 60/39.281 |
| 6,459,963 B1 * | 10/2002 | Bennett et al. | ..................... | 701/3 |
| 6,480,764 B2 | 11/2002 | Blondel et al. | | |
| 6,712,314 B2 | 3/2004 | Stephan | | |
| 6,745,113 B2 * | 6/2004 | Griffin et al. | ..................... | 701/3 |
| 7,082,767 B2 | 8/2006 | Guillot-Salomon et al. | | |
| 7,174,704 B2 * | 2/2007 | Renggli | .......................... | 60/204 |
| 2002/0072831 A1 * | 6/2002 | Blondel et al. | ..................... | 701/3 |

* cited by examiner

*Primary Examiner* — James Trammell
*Assistant Examiner* — Muhammad Shafi
(74) *Attorney, Agent, or Firm* — Charles A. Lemaire; Jonathan M. Rixen; Lemaire Patent Law Firm, P.L.L.C.

(57) ABSTRACT

A method includes controlling an aircraft during descent, and controlling the engine pressure ratio of a jet engine so that the engine has a substantially equal pressure at the exhaust, and at the front of the engine during the descent.

20 Claims, 4 Drawing Sheets

AIRCRAFT ENGINE MANAGEMENT FOR FUEL CONSERVATION METHOD

RELATED APPLICATIONS

This application is a divisional of and claims benefit of U.S. patent application Ser. No. 12/832,491, filed on Jul. 8, 2010, titled "AIRCRAFT ENGINE MANAGEMENT FOR FUEL CONSERVATION METHOD AND APPARATUS" (which issued as U.S. Pat. No. 8,014,913 on Sep. 6, 2011), which is a divisional of and claims benefit of U.S. patent application Ser. No. 11/831,697, filed on Jul. 31, 2007, titled "AIRCRAFT ENGINE MANAGEMENT FOR FUEL CONSERVATION" (which issued as U.S. Pat. No. 7,769,503 on Aug. 3, 2010), which claimed the benefit of priority, under 35 U.S.C. §119(e), to U.S. Provisional patent application No. 60/820,972, filed on Aug. 1, 2006, titled "AIRCRAFT ENGINE MANAGEMENT FOR FUEL CONSERVATION", and U.S. Provisional patent application Ser. No. 60/824,941, filed on Sep. 8, 2006, titled "AIRCRAFT ENGINE MANAGEMENT FOR FUEL CONSERVATION," each of which is incorporated herein by reference in its entirety.

BACKGROUND

One of the larger costs in the airline industry is the cost of fuel. Currently companies in the airline industry run on very slim profit margins. Management of any company, including the companies in the airline industry, knows that containing or reducing costs generally will yield higher profits. In addition to increasing company profits, if fuel can be saved in the aircraft industry it is good for the earth and the environment. Fossil fuels are being used at increasing rates around the world. World reserves of fossil fuels are limited. So, it is advantageous to conserve as much fuel as possible so as to extend the life of world reserves. This provides added time for development of alternative means of energy.

Currently aircraft manufacturers and/or airlines set forth instructions or protocols that include many aspects of the operations of an aircraft including preflight procedures, departure procedures, shut down procedures, and procedures for securing the aircraft. The procedures are very detailed and airline pilots and other professional pilots are generally taught to follow these procedures very closely. Procedure manuals, such as an aircraft operating manual, and a cockpit operating manual, detail procedures for start, taxiing, take off, climb, cruise, descent, approach and landing. The current protocol for descent from cruising altitude to about 11,000-9,000 feet generally instructs pilots to set the engine at idle speed during the descent. One of the parameters that is measured and monitored for some airliner procedures is the engine pressure ratio (EPR). The EPR is defined to be the total pressure ratio across the engine. Thus, the EPR is the ratio of the pressure at the exhaust of a turbojet engine to the pressure measured at the front face of the turbojet engine. A first pressure sensor is placed at the front face of a turbojet engine, and a second pressure sensor is placed at the exhaust of the turbojet engine. Given these two pressures, the EPR can be easily determined for an operating engine and displayed to the pilot on a cockpit dial. The EPR is a parameter that is monitored by a pilot during certain maneuvers. For example for one type of aircraft, the EPR during takeoff is monitored so that it stays at approximately 2.1. Of course, this EPR setting changes for different types of aircraft, different engines, different environmental conditions (such as weather), and can also changes as a function of the weight of the aircraft. While cruising, the EPR varies as a function of altitude, temperature, weight and type of engine. In many aircraft the EPR is monitored during many of the various procedures of the aircraft. In other aircraft, the EPR is not monitored and the EPR is not a parameter that is referred to during various procedures. However, the same factors that affect the EPR still affects the operations of the aircraft.

During descent from altitude, the protocol is to place the turbojet in an idle mode. During the idle mode, at about flight level 330 (33,000 feet)+the EPR corresponding to idle mode is approximately 0.8. This means that the pressure at the front of the turbojet is higher than the pressure at the exhaust of the turbojet. As a result, the engine acts as a speed brake during at least a portion of the descent. As the aircraft descends the air gets more dense. The result is that the EPR rises as the aircraft descends. In many instances the EPR may be near 1.0 at 10,000 feet. Of course this can vary based on the atmospheric pressure at any given time. However, during the time when the EPR is less than 1.0, the engine acts as a speed brake with as much as 0.3 to 63 square feet or more of frontage. With the engine acting as a speed brake, the descent takes longer and wastes jet fuel. Most procedures require a pilot to throttle back to idle during the descent. If an entire fleet of airliners follow such a procedure for descent, the amount of fuel waste is significant. Of course, when fuel costs are high, fuel expense is also high.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures, and:

The description set out herein illustrates the various embodiments of the invention, and such description is not intended to be construed as limiting in any manner.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
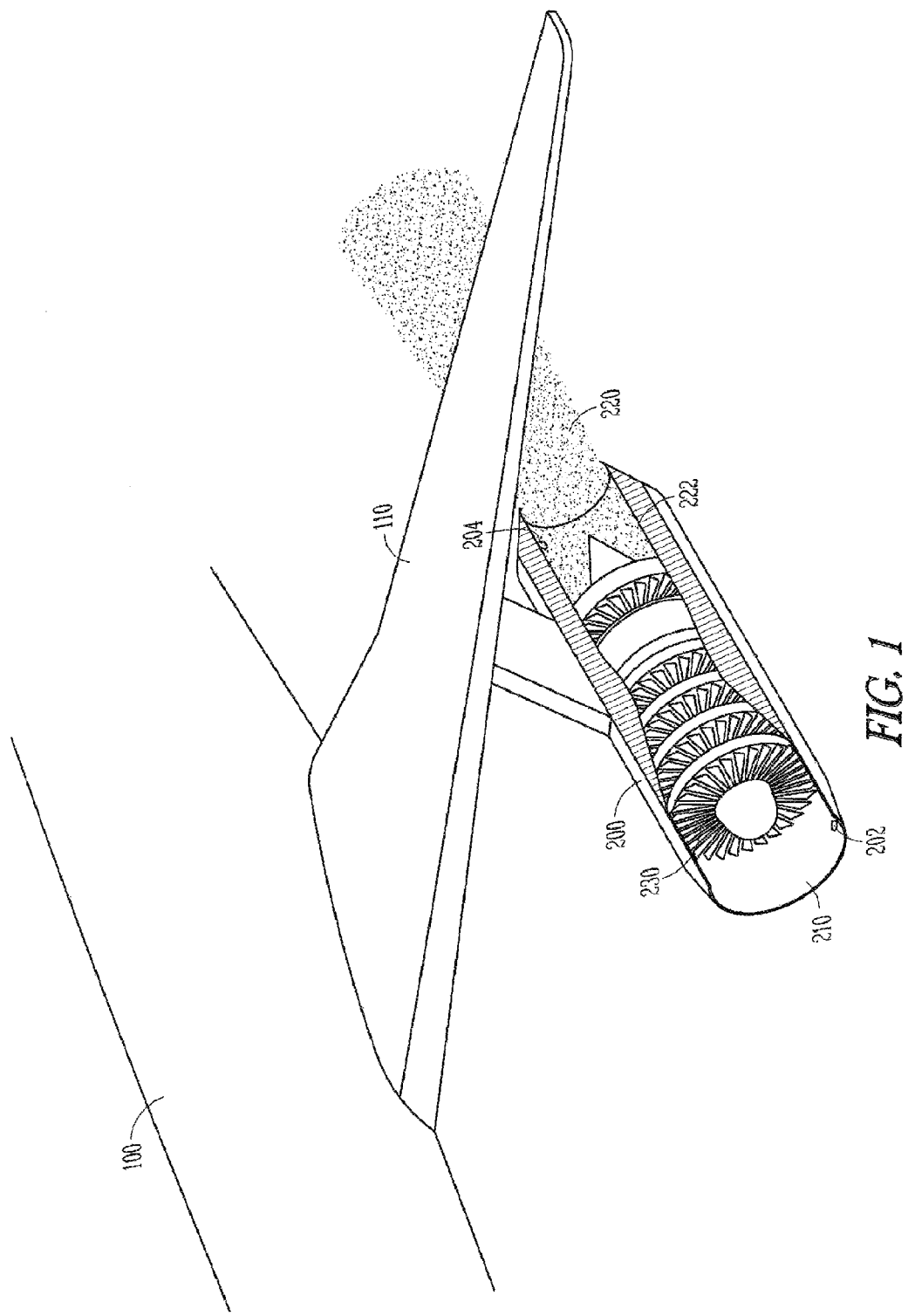
FIG. 1 is a schematic diagram of a turbojet engine on an aircraft during descent, according to an example embodiment.

FIG. 1 is a schematic diagram of an aircraft 100 that has a turbojet engine 200, according to an example embodiment. As shown in FIG. 1, the aircraft 100 is operating during a descent from a cruising altitude. The turbojet engine 200 is attached to a wing 110 of the aircraft. It should be noted that the turbojet engine 200 can be attached to various portions of the wing or may be mounted in or near the vertical stabilizer (not shown) of the aircraft 100. The turbojet engine 200 includes an intake 210 and an exhaust 220. The turbojet engine also includes a turbine 230. The turbine includes several groupings of turbine blades or buckets which compress air taken at the intake and heat the air. Along the length of the turbine 230 is a mechanism for introducing and burning fuel. The combusted fuel turns several other or at least one other set of blades or buckets within the turbine 230 and leaves the turbojet engine 210 as exhaust 220. The exhaust 220 is directed through a nozzle 222 at an end of the turbojet engine 200. The turbojet engine 200 also includes several pressure sensors. In fact there are pressure sensors located at various points along the turbine. As shown in FIG. 1, the turbojet 200 includes a first sensor 202 at the front face of the turbine 230 on the intake end 210 of the turbojet engine. A second sensor 204 is located at the end of the nozzle or at the end of the turbojet 200.

Figure 2:
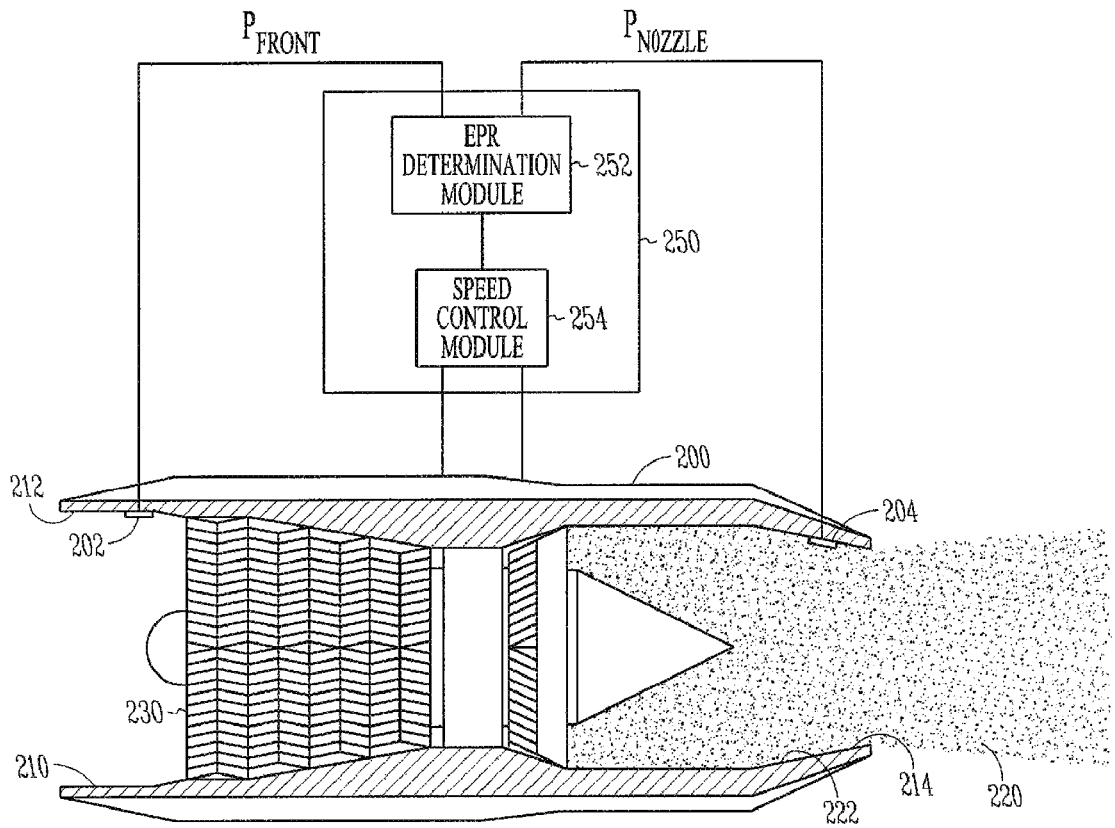
FIG. 2 is a schematic diagram of a turbojet and EPR control system, according to another example embodiment.

FIG. 2 is a schematic diagram of the turbojet 200 along with an engine pressure ratio control system 250, according to an example embodiment. The turbojet engine 200 includes a housing 210 having an inlet end 212 and a outlet end 214. The turbojet engine 200 also includes a compressor or turbine 230 for compressing the gases. The compressor or turbine 230 is located between the inlet end 212 and the outlet end 214 of the housing 210. The turbojet engine 200, as mentioned previously has a sensor 202 at the front face of the turbine 230 and another pressure sensor 204 at the exhaust end of the turbojet engine and specifically at the end of the nozzle 222. The EPR control system 250 includes an EPR determination module 252 and a speed control module 254. The speed control, in the form of the speed control module 254, is communicatively coupled to the compressor of turbine 230 for controlling the speed of the compressor.

The turbojet engine 200 and the controls also form a system. The turbojet engine 200 includes a speed control 252 communicatively coupled to the compressor or turbine 230 for controlling the speed of the compressor or turbine 230. The system also includes the first pressure sensor 202 positioned near the inlet end 212 of the turbojet engine 200, the second pressure sensor 204 positioned near the outlet end 214 of the turbojet engine 230. The system also includes a device, such as the EPR determination module 252, that determines the ratio of the output from the first pressure sensor 202 to the output of the second pressure sensor 204. The system also includes a controller, such as computer system 2000 (shown in FIG. 4) that controls the speed control to maintain the ratio between the output of the first pressure sensor 202 and the output of the second pressure sensor 204 at a nearly constant value. In one embodiment, the controller 2000 controls the speed of the compressor or turbine 230 to keep the ratio is in a range from 0.90 to 1.15. In another embodiment, the controller 2000 controls the speed of the compressor or turbine 230 to keep the ratio substantially near 1.0. The controller 2000 is capable of controlling the ratio or keeping the ratio substantially constant ratio during a descent of an airplane. In one embodiment of the system, the second pressure sensor 204 is positioned near the end of a nozzle portion of the housing 210 and the first pressure sensor 204 is positioned near a front face of the compressor or turbine 230.

In operation the nozzle pressure is determined or measured at sensor 204 and the front pressure is measured at sensor 202. The pressure measurements are input to the EPR determination module 252. The EPR determination module divides the pressure found at the nozzle by the pressure found at the front to determine the EPR. Output from the EPR determination module 252 is input to the speed control module 254. Speed control module 254 can also be thought of as a pressure control module. The outputs from the pressure control module are input to various portions of the engine or turbojet engine 230. The input from the EPR determination module 252 is compared to a desired EPR or selected EPR. If the measured and determined EPR is different from the selected or desired EPR then the speed or pressure control module 254 output signal to the turbojet engine to change certain parameters so that the EPR will approach or be substantially equal to the selected or desired EPR. For example, during descent of an aircraft 100 the desired EPR may be approximately 1.0 or in some selected range about 1.0. For example, the selected range may be from 0.99 to 1.01 for the EPR. In another embodiment, the selected range might be from 0.95 to 1.05. And still in other embodiments the selected or desired range for the EPR may be from 0.90 to 1.10. The speed control or pressure control 254 varies engine parameters to either bring the EPR within a desired range or bring the EPR close to a desired or selected value. For example, in one example embodiment, the speed or pressure control module 254 may vary the amount of fuel added to the compressed air which is to be combusted in the turbojet engine 200. In other examples, other parameters may be varied.

Figure 3:
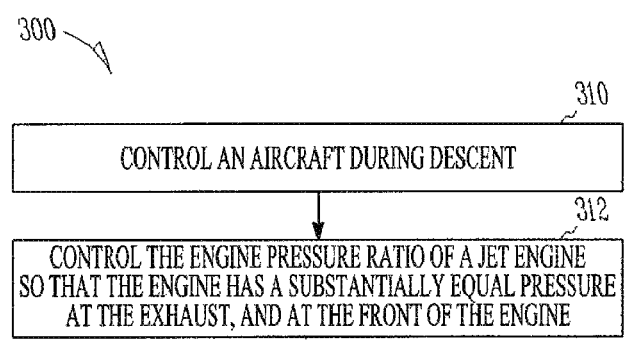
FIG. 3 is a process flow diagram for maintaining the EPR within a selected range during a descent, according to an example embodiment.

FIG. 3 is a process flow diagram of a method 300 for maintaining or controlling the EPR within a selected range or to a selected amount during a descent of an aircraft, according to an example embodiment. The aircraft is controlled during a descent from a cruising altitude as depicted by reference numeral 310. In addition to controlling the aircraft the engine pressure ratio or EPR of the jet engine or turbojet is controlled so that the engine has a substantially equal pressure at the exhaust as well as at the front of the engine as depicted by reference numeral 312. When the pressure at the front of the engine and the pressure at the back of the engine are substantially equal it minimizes the effect of the engine acting as an air brake during the descent of the aircraft.

Implementation of this method 300 or protocol has many advantages. Less fuel is used since the turbojet or jet engine is not fighting the descent. In other words, the engine is not acting as a speed brake during the descent. Descent is generally referred as the portion of the flight from cruising altitude to approximately 9,000-11,000 feet. Using the procedure where the jet engine or jet engines are set to idle during the descent, the EPR will move from a value of approximately 0.8 to 1.0 during the descent. This is due to the fact that the air becomes more dense at lower altitudes. Implementation of the method 300 requires that the EPR remain at or near 1.0 during the descent. This requires the throttle to be adjusted during the descent. The idle speed of the turbojet is generally lower than when the turbojet has an EPR of approximately 1.0. The time of descent will be slightly greater and take slightly longer however the net amount of fuel burned will be less during the descent when using the method 300 when compared to the procedure where the turbojet was placed in idle mode during descent.

Figure 5:
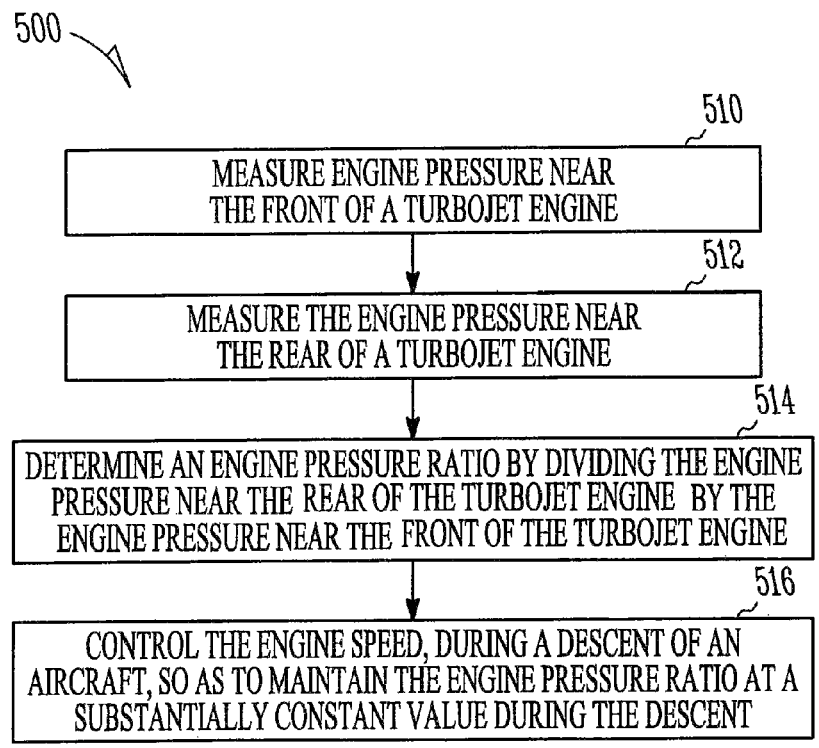
FIG. 5 is a flow diagram of a method, according to an example embodiment.

FIG. 5 is a flow diagram of a method 500, according to an example embodiment. The method 500 includes measuring engine pressure near the front of a turbojet engine 510, measuring the engine pressure near the rear of a turbojet engine 512, and determining an engine pressure ratio by dividing the engine pressure near the rear of the turbojet engine by the engine pressure near the front of the turbojet engine 514. The method 500 also includes controlling the engine speed 516, during a descent of an aircraft, so as to maintain the engine pressure ratio at a substantially constant value during the descent. In one embodiment, controlling the engine speed 516 during a descent of an aircraft during to maintain the engine pressure ratio at a substantially constant value during the descent includes maintaining the engine pressure ratio in a range of 1.11 to 0.87. In another embodiment, the engine pressure ratio is maintained within a range of 0.95 to 1.05. In still another embodiment, the engine pressure ratio is maintained within a range of 0.98 to 1.02. In yet another embodiment, the engine pressure ratio is maintained substantially near 1.0. Measuring the engine pressure near the front of a turbojet engine 510 includes measuring the pressure near the front face of a compressor of a turbojet engine, while measuring engine pressure near the rear of a turbojet engine 512 includes measuring the pressure near a nozzle shaped end of the turbojet engine. Controlling the engine speed 516 of the turbojet engine includes controlling the rotational speed of a compressor of the turbojet engine.

Figure 6:
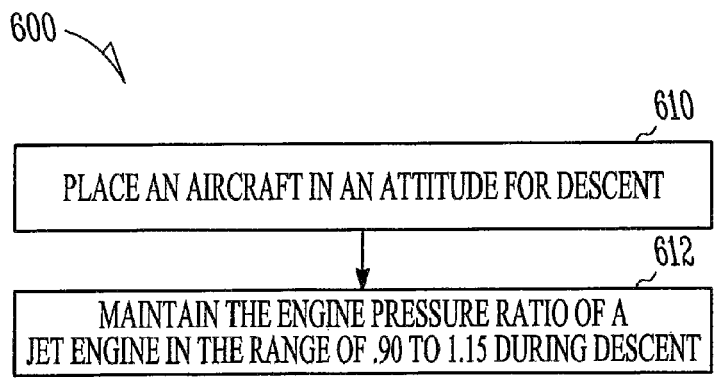
FIG. 6 is a flow diagram of a method, according to an example embodiment.

FIG. 6 is a flow diagram of a method 600, according to an example embodiment. The method 600 includes placing an aircraft in an attitude for descent 610, and maintaining the engine pressure ratio of a jet engine in the range of 0.90 to 1.15 during the descent 612. In one embodiment, the engine pressure ratio is maintained in a range of 1.0 to 1.05, and in another embodiment the engine pressure ratio is maintained at a substantially constant value.

Figure 4:
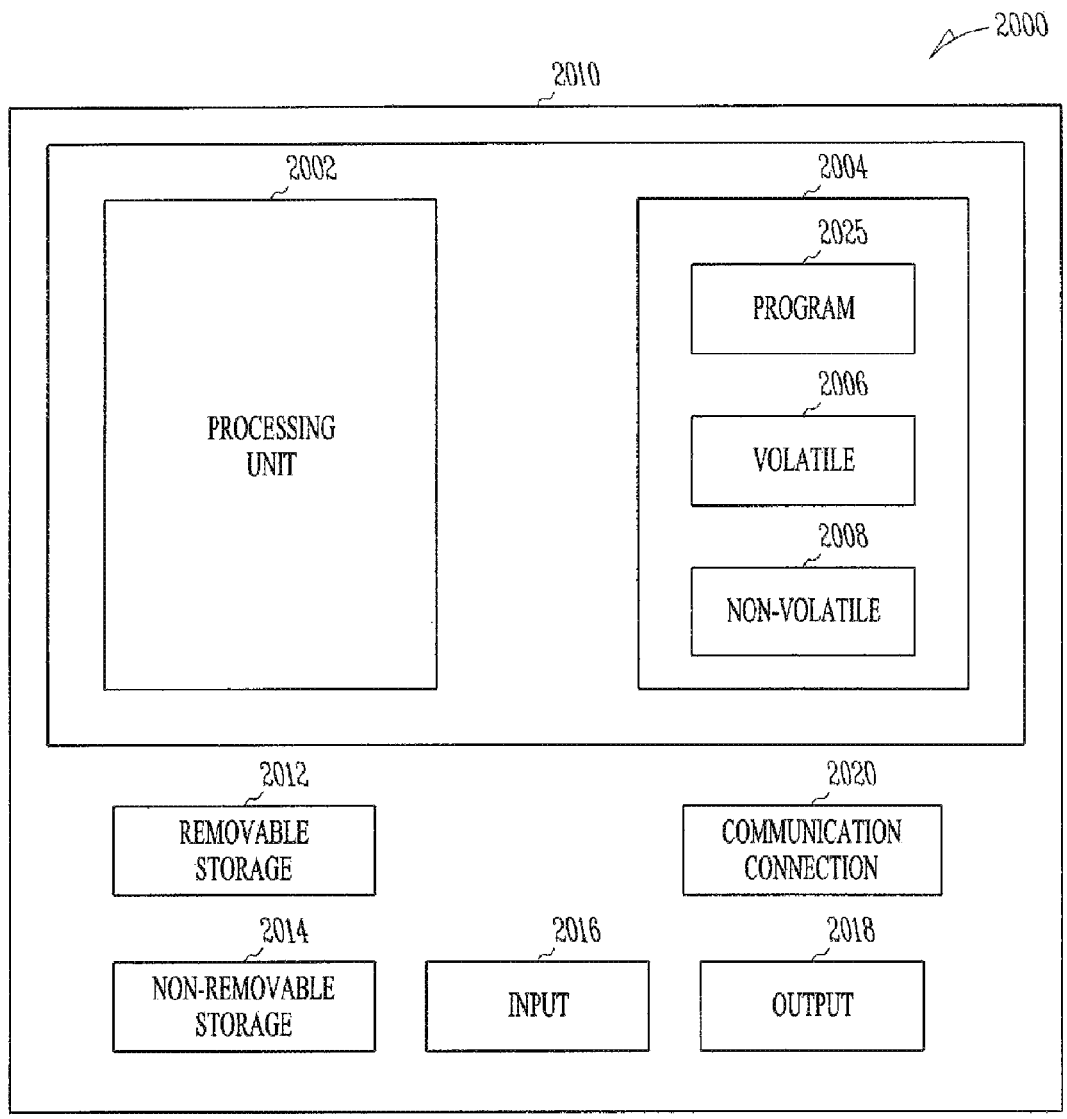
FIG. 4 is a block diagram of a computer system that executes programming for performing the above algorithm, according to an example embodiment.

The system 200 for controlling the turbojet or other jet engine during descent can be controlled by a computer system 2000 to control either the entire energy conversion process or specific portions of the energy conversion process. A block diagram of a computer system that executes programming for performing the above algorithm is shown in FIG. 4. A general computing device in the form of a computer 2010, may include a processing unit 2002, memory 2004, removable storage 2012, and non-removable storage 2014. Memory 2004 may include volatile memory 2006 and non-volatile memory 2008. Computer 2010 may include, or have access to a computing environment that includes, a variety of computer-readable media, such as volatile memory 2006 and non-volatile memory 2008, removable storage 2012 and non-removable storage 2014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 2010 may include or have access to a computing environment that includes input 2016, output 2018, and a communication connection 2020. One of the inputs could be a keyboard, a mouse, or other selection device. The communication connection 2020 can also include a graphical user interface, such as a display. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 2002 of the computer 2010. A hard drive, CD-ROM, and RAM are some examples of articles including a computer-readable medium. For example, a computer program 2025 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer system 2000 to provide generic access controls in a COM based computer network system having multiple users and servers.

A machine-readable medium that provides instructions that, when executed by a machine, cause the machine to perform various operations of the engine. A machine-readable medium includes a set of instructions. The instructions, when executed by a machine, cause the machine to perform operations that include measuring engine pressure near the front of a turbojet engine, measuring the engine pressure near the rear of a turbojet engine, determining an engine pressure ratio by dividing the engine pressure near the rear of the turbojet engine by the engine pressure near the front of the turbojet engine, and controlling the engine speed to maintain the engine pressure ratio at a substantially constant value during a descent of an aircraft. The instructions of the machine-readable medium can cause the machine to maintain the engine pressure ratio at a substantially constant value in a range of 0.95 to 1.05, or maintain the engine pressure ratio at a substantially constant value in a range of 0.98 to 1.02. In still another embodiment, the set of instructions cause the machine to maintain the engine pressure ratio at a substantially constant value substantially near 1.0.

It should be noted that the ratio of the engine pressures may not be referred to in some turbojet engines as the engine pressure ratio. There may be equivalent measures or may be substantially equivalent measures and a different term may be used.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A computerized method for reducing a net amount of fuel consumed during a flight when running a jet engine on an airplane, wherein the jet engine includes a housing having an inlet end and an outlet end, and a compressor located between the inlet end and the outlet end, and wherein the airplane includes an engine-control computer for controlling the engine, the method comprising:

measuring a first pressure near the inlet end of the jet engine;

measuring a second pressure near the outlet end of the jet engine; and controlling a speed of the compressor with the engine-control computer to maintain a value of the second pressure divided by the first pressure at a controlled first value in a range of 0.9 to 1.15 at a plurality of descent altitudes from cruising altitude to approximately 9,000-11,000 feet at which the jet engine, if set to idle, would have a value of the second pressure divided by the first pressure of less than the first value in order to reduce the jet engine acting as a speed brake for the airplane during a descent of the airplane, in order to reduce the net amount of fuel consumed during the flight.

2. The method of claim 1, wherein the controlling of the compressor speed further includes maintaining the value of the second pressure divided by the first pressure in a range of 0.90 to 1.10 during the descent of the airplane.

3. The method of claim 1, wherein the controlling of the compressor speed further includes maintaining the value of the second pressure divided by the first pressure in a range of 0.95 to 1.05 during the descent of the airplane.

4. The method of claim 1, wherein the controlling of the compressor speed further includes maintaining the value of the second pressure divided by the first pressure in a range of 0.98 to 1.02 during the descent of the airplane.

5. The method of claim 1, wherein the controlling of the compressor speed further includes maintaining the value of the second pressure divided by the first pressure in a range of 0.99 to 1.01 during the descent of the airplane.

6. The method of claim 1, wherein the controlling of the compressor speed further includes maintaining the value of the second pressure divided by the first pressure substantially at 1.0 during the descent of the airplane.

7. The method of claim 1, wherein the measuring of the second pressure further includes measuring the second pressure near an end of a nozzle portion of the housing, and wherein the measuring of the first pressure further includes measuring the first pressure near a front face of the compressor.

8. A computerized method for reducing a net amount of fuel consumed during a flight when controlling engine speed of a jet engine of an aircraft during a descent of the aircraft, wherein the aircraft includes an engine-control computer for controlling the engine, the method comprising:
  measuring engine pressure near a front of the jet engine;
  measuring the engine pressure near a rear of the jet engine;
  determining an engine-pressure ratio (EPR) by dividing the engine pressure near the rear of the jet engine by the engine pressure near the front of the jet engine; and
  controlling the engine speed with the engine-control computer to maintain the engine-pressure ratio at a controlled first EPR value in a range of 0.9 to 1.1 at a plurality of descent altitudes from cruising altitude to approximately 9,000-11,000 feet at which the jet engine, if set to idle, would have an engine-pressure ratio of less than the first EPR value in order to reduce the jet engine acting as a speed brake for the aircraft during the descent of the aircraft, in order to reduce the net amount of fuel consumed during the flight.

9. The method of claim 8, wherein the controlling of the engine speed further includes controlling the engine speed to maintain the engine-pressure ratio in a range of 0.95 to 1.05 during the descent of the aircraft.

10. The method of claim 8, wherein the controlling of the engine speed further includes controlling the engine speed to maintain the engine-pressure ratio in a range of 0.98 to 1.02.

11. The method of claim 8, wherein the controlling of the engine speed further includes controlling the engine speed to maintain the engine-pressure ratio in a range of 0.99 to 1.01.

12. The method of claim 8, wherein the controlling of the engine speed further includes controlling the engine speed to maintain the engine-pressure ratio substantially at 1.0.

13. A computerized method for reducing a net amount of fuel consumed during a flight when running a jet engine on an airplane, the jet engine including a speed-control module, the method comprising:
  determining an engine pressure ratio (EPR) by dividing a first engine pressure near a rear of the jet engine by a second engine pressure near a front of the jet engine; and
  controlling an engine speed of the jet engine with the speed-control module during a descent of the airplane to maintain the engine-pressure ratio at a controlled first EPR value in a range between 0.9 and 1.15 at a plurality of descent altitudes from cruising altitude to approximately 9,000-11,000 feet at which the jet engine, if set to idle, would have an engine-pressure ratio of less than the first EPR value in order to reduce the jet engine acting as a speed brake for the airplane during the descent of the airplane, in order to reduce the net amount of fuel consumed during the flight.

14. The method of claim 13, wherein the controlling of the engine speed further includes maintaining the engine-pressure ratio in a range between 0.9 and 1.10 during the descent.

15. The method of claim 13, wherein the controlling of the engine speed further includes maintaining the engine-pressure ratio in a range between 0.95 and 1.05 during the descent.

16. The method of claim 13, wherein the controlling of the engine speed further includes maintaining the engine-pressure ratio in a range between 0.98 and 1.02 during the descent.

17. The method of claim 13, wherein the controlling of the engine speed further includes maintaining the engine-pressure ratio in a range between 0.99 and 1.01 during the descent.

18. The method of claim 13, wherein the controlling of the engine speed further includes maintaining the engine-pressure ratio substantially at 1.0.

19. The method of claim 13, wherein the controlling of the engine speed further includes controlling a rotational speed of a compressor of the jet engine.

20. The method of claim 13, wherein the controlling of the engine speed further includes maintaining the engine-pressure ratio in a range between 1.0 and 1.05 during the descent.

* * * * *